(12) United States Patent
Miller et al.

(10) Patent No.: US 9,439,497 B2
(45) Date of Patent: Sep. 13, 2016

(54) OSCILLATING LINEAR ACTUATOR

(71) Applicant: L'Oreal, Paris (FR)

(72) Inventors: Zane Bowman Allen Miller, Seattle, WA (US); Aaron David Poole, Federal Way, WA (US)

(73) Assignee: L'Oreal, Paris (FR)

( * ) Notice: Subject to any disclaimer, the term of this patent is extended or adjusted under 35 U.S.C. 154(b) by 90 days.

(21) Appl. No.: 14/504,151

(22) Filed: Oct. 1, 2014

(65) Prior Publication Data

US 2016/0095413 A1    Apr. 7, 2016

(51) Int. Cl.
| | | |
|---|---|---|
| *B65D 88/54* | (2006.01) | |
| *G01F 11/00* | (2006.01) | |
| *A45D 34/04* | (2006.01) | |
| *H02K 7/065* | (2006.01) | |
| *H02K 33/00* | (2006.01) | |
| *B05C 17/005* | (2006.01) | |
| *F04B 9/02* | (2006.01) | |
| *F04B 9/04* | (2006.01) | |
| *F04B 9/123* | (2006.01) | |
| *F04B 53/14* | (2006.01) | |
| *A46B 13/00* | (2006.01) | |
| *A46B 5/00* | (2006.01) | |
| *A46B 13/02* | (2006.01) | |

(52) U.S. Cl.
CPC ............. *A45D 34/04* (2013.01); *A46B 5/0095* (2013.01); *A46B 13/00* (2013.01); *A46B 13/02* (2013.01); *B05C 17/00569* (2013.01); *F04B 9/02* (2013.01); *F04B 9/047* (2013.01); *F04B 9/123* (2013.01); *F04B 53/14* (2013.01); *H02K 7/065* (2013.01); *H02K 33/00* (2013.01); *A46B 2200/102* (2013.01)

(58) Field of Classification Search
CPC .... A45D 34/04; A46B 5/0095; A46B 13/00; A46B 13/02; A46B 2200/102; B05C 14/00569; B05C 17/00576; B05C 17/0133; F04B 9/02; F04B 9/047; F04B 9/123; F04B 53/14; H02K 7/065; H02K 33/00; B05B 11/0048; B05B 11/02
USPC .................. 222/333, 386–393; 401/172, 175
See application file for complete search history.

(56) References Cited

U.S. PATENT DOCUMENTS

| | | |
|---|---|---|
| 3,771,918 A | 11/1973 | Winter |
| 5,736,797 A | 4/1998 | Motohashi |
| 5,752,811 A | 5/1998 | Petro |
| 5,964,580 A | 10/1999 | Taga |

OTHER PUBLICATIONS

Casasanta, V., "Cosmetic Formulation Dispensing Head for a Personal Care Appliance," U.S. Appl. No. 14/331,840, filed Jul. 15, 2014.

*Primary Examiner* — Patrick M Buechner
*Assistant Examiner* — Jeremy W Carroll
(74) *Attorney, Agent, or Firm* — Christensen O'Connor Johnson Kindness PLLC

(57) ABSTRACT

A linear actuator includes an oscillating component that includes a threaded element, a traveler located inside the oscillating component that includes a mating threaded element, and a directional clutch located between the oscillating component and the traveler. The oscillating component is configured to be coupled to a source of oscillating motion and to be driven by the source of oscillating motion to cause oscillatory movements of the oscillating component. The directional clutch is configured to cause the oscillating component to drive the traveler in the first rotational direction when the oscillating component is rotated in the first rotational direction and to allow the oscillating component to slip by the traveler when the oscillating component is rotated in the second rotational direction. The threaded element and the mating threaded element are engaged such that rotational movement of the traveler in the first rotational direction causes linear movement of the traveler.

26 Claims, 12 Drawing Sheets

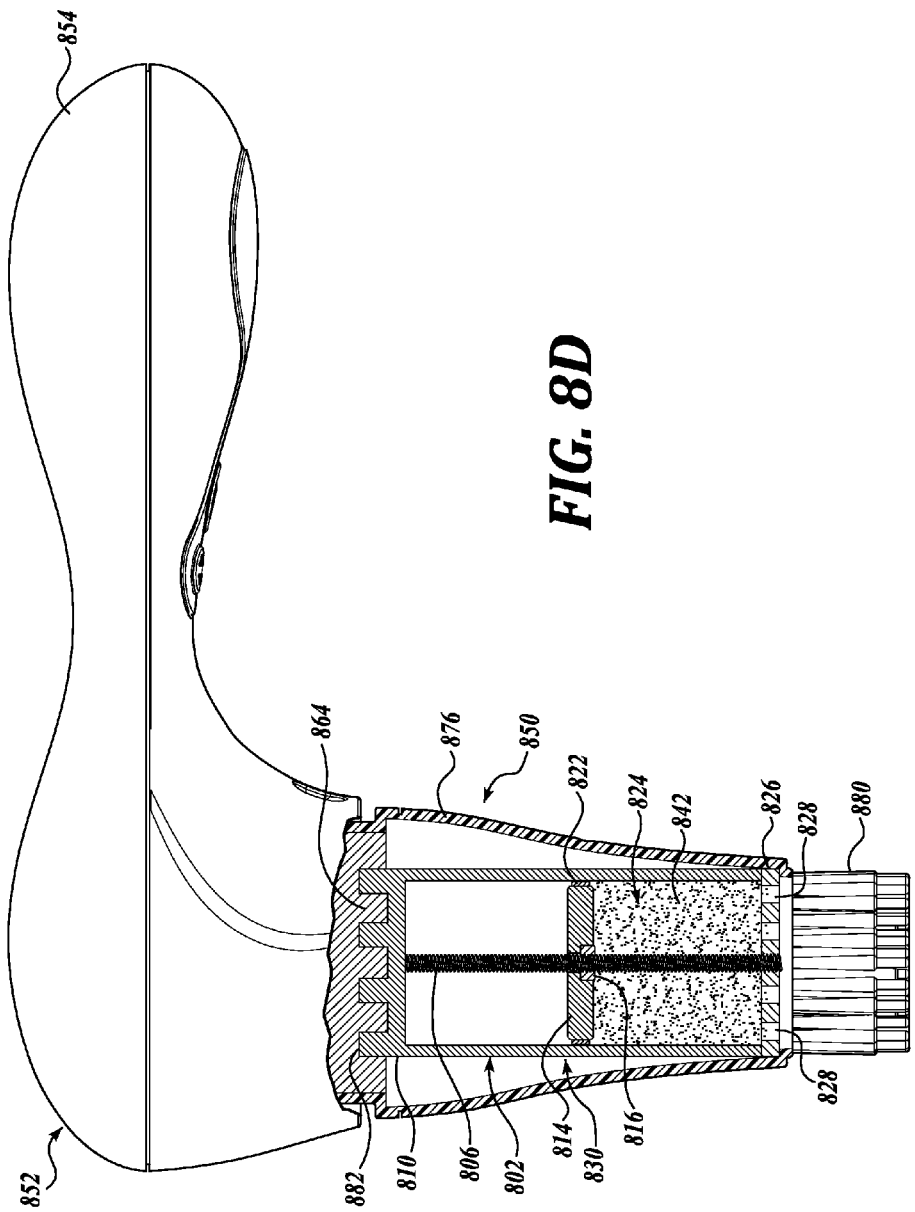

OSCILLATING LINEAR ACTUATOR

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, a pump includes, among other things, an oscillating component. In an embodiment, the pump includes a motor coupled to the oscillating component. In an embodiment, the pump includes a traveler operably coupled to the oscillating component. In an embodiment, the traveler is located inside of the oscillating component. In an embodiment, the pump includes a directional clutch. In an embodiment, the directional clutch is located between at least a portion of the oscillating component and at least a portion of the traveler. In an embodiment, the pump is configured to cause the oscillating component to move in an oscillatory manner between a first rotational direction and a second rotational direction about a longitudinal axis of the pump responsive to an applied force. For example, in an embodiment, the pump includes a directional clutch having a first coefficient of friction when the oscillating component rotates in the first rotational direction and a second coefficient of friction when the oscillating component rotates in the second rotational direction. In an embodiment, the first coefficient of friction is greater than the second coefficient of friction such that actuating rotation of the oscillating component in the first rotational direction causes rotation of the traveler in the first rotational direction and rotation of the oscillating component in the second rotational direction causes the oscillating component to slip by the traveler. In an embodiment, the oscillating component includes a threaded element and the traveler is configured to have a mating threaded element. In an embodiment, the threaded element of the oscillating component and the mating threaded element of the traveler are operably engaged such that rotational movement of the traveler in the first rotational direction causes linear movement of the traveler substantially parallel to the longitudinal axis.

In an embodiment, the pump includes a variable volume reservoir bounded in part by the oscillating component and the traveler. In an embodiment, the variable volume reservoir is configured to be reduced in size by the linear movement of the traveler. In an embodiment, the pump includes a substance located within the variable volume reservoir and a cap comprising at least one outlet. In an embodiment, the variable volume reservoir is bounded in part by the cap and the variable volume reservoir is configured such that at least a portion of the substance flows through the at least one outlet in response to the size of the variable volume reservoir being reduced by the linear movement of the traveler. In an embodiment, the pump includes a bladder located within the variable volume reservoir where the substance is located within the bladder and the bladder is in fluid communication with the at least one outlet. In an embodiment, the substance includes a cosmetic formulation.

In an embodiment, a linear actuator includes an oscillating component. In an embodiment, the linear actuator includes a traveler operably coupled to the oscillating component. In an embodiment, the linear actuator includes a directional clutch located between at least a portion of the oscillating component and at least a portion of the traveler.

In an embodiment, the oscillating component is configured to be coupled to the source of oscillating motion and to be driven by the source of oscillating motion to cause oscillatory movements of the oscillating component. In an embodiment, the directional clutch is configured to cause the oscillating component to drive the traveler responsive to an actuating force. For example, in an embodiment, the directional clutch is configured to cause the oscillating component to drive the traveler in the first rotational direction when the oscillating component is rotated in the first rotational direction and to allow the oscillating component to slip by the traveler when the oscillating component is rotated in the second rotational direction. In an embodiment, a threaded element of the oscillating component and a mating threaded element of the traveler are engaged such that rotational movement of the traveler in the first rotational direction causes linear movement of the traveler.

In an embodiment, the threaded element of the oscillating component includes a central screw located substantially coaxially with the longitudinal axis and the central screw has external threads. The mating threaded element of the traveler includes a bushing having internal threads configured to engage the external threads of the central screw. The bushing includes a nut embedded in a disc-shaped portion of the traveler.

The traveler can have any geometric shape including regular or irregular shapes. For example, in an embodiment, the traveler comprises a disc shape having a surface around a circumference of the disc shape. In an embodiment, the directional clutch is located on at least a portion of the surface around the circumference of the disc shape. In an embodiment, the directional clutch located on the at least a portion of the surface is configured to engage an inner surface of the oscillating component. The mating threaded element and the directional clutch can both be located on at least a portion of the surface around the circumference of the disc shape. The mating threaded element can be located on the at least a portion of the surface is configured to engage internal threads on an inner surface of the oscillating component.

In an embodiment, the mating threaded element of the traveler includes a central screw having external threads. In an embodiment, the threaded element of the oscillating component includes a bushing having internal threads configured to engage the external threads of the central screw.

In an embodiment, a system includes an appliance comprising a motor and an applicator head coupled to the appliance. The applicator head includes an oscillating component, a traveler operatively coupled to the oscillating component, a directional clutch located between at least a portion of the oscillating component and at least a portion of the traveler, a variable volume reservoir comprising at least one outlet, and a substance stored in the variable volume reservoir. The oscillating component can be configured to be coupled to the motor when the applicator head is coupled to the appliance and to be driven by the motor to cause oscillatory movements of the oscillating component. The directional clutch is configured to cause the oscillating component to drive the traveler in the first rotational direction when the oscillating component is rotated in the first rotational direction and to allow the oscillating component to slip by the traveler when the oscillating component is rotated in the second rotational direction. A threaded element of the oscillating component and a mating threaded element of the traveler are engaged such that rotational movement of the traveler in the first rotational direction causes linear movement of the traveler causing at least a portion of the substance to flow out of the variable volume reservoir through the at least one outlet.

In an embodiment, the appliance further includes one or more input controls configured to receive user inputs for controlling the motor in order to control a flow rate of the at least a portion of the substance flowing through the at least one outlet. The applicator head can be detachable from the appliance and the appliance can be configured to be coupled to a different applicator head following detachment of the applicator head from the appliance. The substance can be a cosmetic formulation. The at least one outlet can be configured to allow the cosmetic formulation to flow from the variable volume reservoir to an end of the applicator head. The end of the applicator head includes at least one of bristles, a sponge, or a pad, and the at least one of the bristles, the sponge, or the pad is configured to apply the cosmetic formulation to a user's skin.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8D depicts an embodiment of the applicator head and the appliance of FIG. 8A with an oscillating linear displacement pump used in the applicator head.

DETAILED DESCRIPTION

Figure 1A:
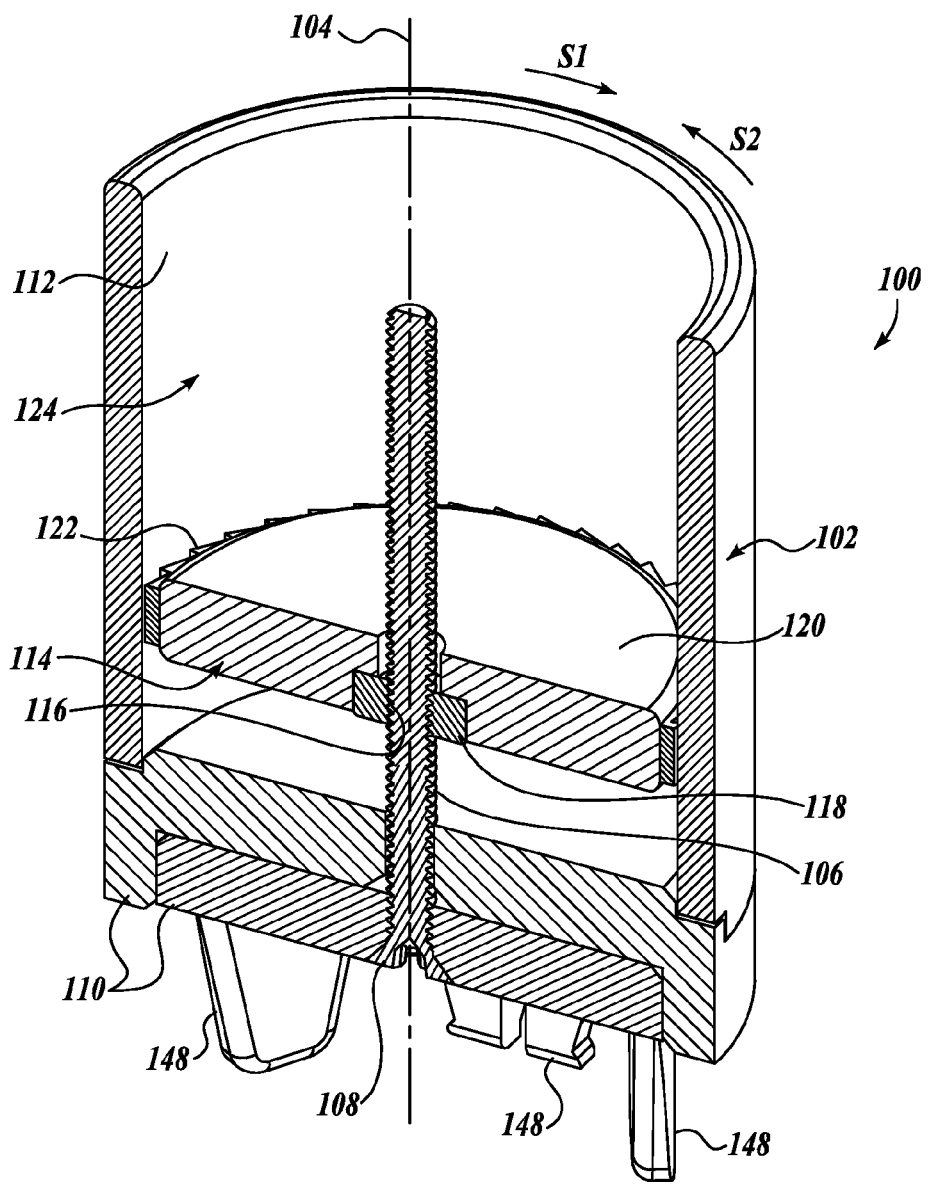
FIG. 1A depicts an embodiment of an oscillating linear actuator and FIG. 1B depicts an embodiment of an oscillating linear displacement pump.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of systems, apparatuses, and/or methods for implementing technologies and methodologies for driving a linear actuator using oscillatory motion as an input. In an embodiment, the linear actuator is part of a pump used to pump a substance out of a variable volume reservoir. In an embodiment, a pump is used in applicator heads suitable for use with a personal care appliance. In an embodiment, a personal care appliance includes an oscillating motor that drives a linear actuator to dispense a cosmetics formulation from a variable volume reservoir in the formulation applicator head.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Certain personal care appliances are designed to provide oscillatory motion to attachments. Such attachments can be used for many reasons, including brushing a user's skin, exfoliating a user's skin, finishing a cosmetics product on the user's skin, and the like. The oscillatory motion of an appliance can be transferred to an applicator head to perform certain functions, such as oscillating a brush head of the applicator head. An oscillating brush head can be used for brushing a user's skin, exfoliating a user's skin, and other uses.

Applicator heads can also be used for dispensing cosmetic formulations. A cosmetic formulation can include makeup, personal soaps, skin care products, hair care products or other any other cosmetic products. It may be convenient for users to be able to dispense cosmetic formulations from applicator heads, instead of jars, bottles, or other containers, to reduce waste of the cosmetic formulations and to extend the usable life of the cosmetic formulations in the applicator heads. The ability to dispense a cosmetic product from and apply the cosmetic product from the same applicator head can be especially convenient for users.

One difficulty that arises with such appliances and applicator heads is that the appliances transfers oscillating motion to the applicator heads while the applicators heads have pumps that use linear motion to dispense the cosmetic formulations. More generally, a difficulty exists with driving a linear actuator using an oscillatory motion input. A need exists for an oscillatory linear actuator that receives an oscillatory motion input to drive linear motion of a traveler of the oscillatory linear actuator, such as in the case of an oscillating appliance with a cosmetics-product-dispensing actuator head.

Figure 1B:
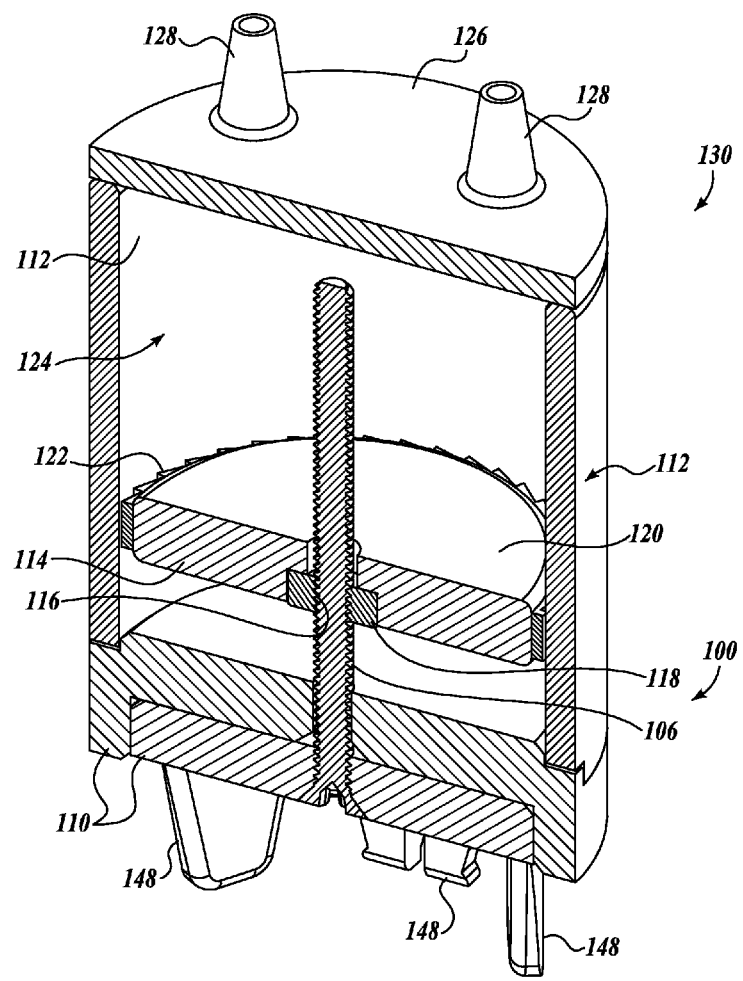

FIGS. 1A and 1B depict an embodiment of an oscillating linear actuator 100. The oscillating linear actuator 100 includes an oscillating component 102 that is configured to be oscillated between a first rotational direction S1 and a second rotational direction S2 about a longitudinal axis 104 of the oscillating linear actuator 100. The oscillating component 102 can be driven by a motor (not shown in FIGS. 1A and 1B) that causes the oscillatory movements of the oscillating component 102. The oscillatory movements of the oscillating component 102 have an oscillation frequency and amplitude such that sufficient movement of the traveler in the first rotational direction S1 occurs within the first half period of oscillation that the directional clutch will not allow movement of the traveler in the second rotational direction S2. In one embodiment, the frequency and the angular displacement are based on one or more of a characteristic of the directional clutch (e.g., a filament length) or a characteristic of the traveler (e.g., a radius of the traveler). In one example, the frequency is within a range between about 100 Hz and about 500 Hz and an angular stroke within a range between about 5° and about 30°. In an embodiment, the oscillating component 102 includes a threaded element 106. In the embodiment depicted in FIGS. 1A and 1B, the threaded element 106 is in the form of external threads on a central screw 108. Other embodiments of the threaded element 106 are discussed below. In an embodiment, the central screw 108 is substantially coaxial with the longitudinal axis 104. In an embodiment, the central screw 108 is coupled to a base 110 of the oscillating component 102. In an embodiment, the oscillating component 102 also includes an inner surface 112 that faces the central screw 108. As shown in FIGS. 1A and 1B, in an embodiment, the base 110 includes multiple pieces. In an embodiment, the multiple pieces of the base 110 aid in loading the traveler 114 in the oscillating component 102 and securing the central screw 108. Alternatively, in another embodiment, the base 110 is formed of a single piece. In another alternative embodiment that can be used with any of the oscillating linear actuators described herein, the base 110 and the portion of the oscillating component 102 with the inner surface 112 are formed as a single piece.

In an embodiment, the oscillating linear actuator 100 includes a traveler 114 located within the oscillating component 102. The traveler 114 includes a mating threaded element 116 that is configured to engage the threaded element 106. In the embodiment depicted in FIGS. 1A and 1B, the mating threaded element 116 is in the form of internal threads on a nut 118. Other embodiments of the mating threaded element 116 are discussed below. In the embodiment depicted in FIGS. 1A and 1B, the nut 118 is embedded in a disc 120 of the traveler 114. In another embodiment, the nut 118 and the disc 120 are formed as a single piece.

In an embodiment, the oscillating linear actuator 100 includes a directional clutch 122. The directional clutch 122 is configured to cause the oscillating component 102 to drive the traveler 114 in the first rotational direction S1 when the oscillating component 102 is rotated in the first rotational direction S1 and to allow the oscillating component 102 to slip by the traveler 114 when the oscillating component 102 is rotated in the second rotational direction S2. To accomplish this, the directional clutch 122 has a first coefficient of friction, when the oscillating component 102 rotates in the first rotational direction S1, that is greater than a second coefficient of friction, when the oscillating component rotates in the second rotational direction S2. The first coefficient of friction allows rotation of the oscillating component 102 in the first rotational direction S1 to cause rotation of the traveler 114 in the first rotational direction S1 and the second coefficient of friction allows the oscillating component 102 to slip by the traveler 114 when the oscillating component 102 is rotated in the second rotational direction S2. In the particular embodiment shown in FIGS. 1A and 1B, the directional clutch 122 is coupled to a surface of the traveler 114 along a circumference of the disc 120. Other embodiments of the directional clutch 122 are discussed below.

In an embodiment, the directional clutch 122 depicted in FIGS. 1A and 1B includes a saw tooth structure that that grips the inner surface 112 of the oscillating component 102 when the oscillating component 102 rotates in the first rotational direction S1 and allows the oscillating component 102 to slip by the traveler 114 when the oscillating component 102 rotates in the second rotational direction S2. In one embodiment, a saw-tooth directional clutch 122 is made of a resilient material, such as plastic or rubber. Alternatively, in another embodiment, the directional clutch 122 is made of a textile, such as velvet, that allows a surface to slip by in one direction and grips the surface in the other direction. In another embodiment, the directional clutch 122 includes a plurality of fibers that are biased in a particular direction. Embodiments of directional clutches are discussed in greater detail below.

In an embodiment, a motor is coupled to the oscillating component 102 and drive the oscillating component 102 to oscillate between the first rotational direction S1 and the second rotational direction S2. In one embodiment, the base 110 of the oscillating component 102 includes one or more tabs 148 that are used to couple the base 110 to the motor. In another embodiment, described in greater detail below, the one or more tabs 148 engage a mating interface that is coupled to the motor.

In an embodiment, each oscillation of the oscillating component 102 includes some rotational movement of the oscillating component 102 in the first rotational direction S1 and some rotational movement of the oscillating component 102 in the second rotational direction S2. The rotational movement of the oscillating component 102 in the first rotational direction S1 will drive some rotation of the traveler 114 in the first rotational direction S1. The directional clutch 122 may not be completely efficient as the oscillating component 102 rotates in the first rotational direction S1 (i.e., the traveler 114 may not rotate as far as the oscillating component 102 rotates during each oscillation). However, the directional clutch 122 will cause some rotation of the traveler 114 in the first rotational direction S1 in response to the rotation of the oscillating component 102 in the first rotational direction S1. During the rotational movement of the oscillating component 102 in the second rotational direction S2, the directional clutch 122 will allow the oscillating component 102 to slip by the traveler 114 as it rotates in the second rotational direction S2. The directional clutch 122 may not be completely efficient as the oscillating component 102 rotates in the second rotational direction S2 (i.e., some torque from the rotation of the oscillating component 102 may be transferred to the traveler 114). In one embodiment, during each oscillation of the oscillating component 102, the traveler 114 will have sufficient rotational momentum in the first rotational direction S1 from being driven by the rotation of the oscillating component 102 in the first rotational direction S1 to overcome any torque transferred to the traveler 114 during the rotation of the oscillating component 102 in the second rotational direction S2. In this way, the traveler 114 will rotate only in the first rotational direction S1 without rotating in the second rotational direction S2 as the oscillating component 102 oscillates between the first rotational direction S1 and the second rotational direction S2.

In an embodiment, the interaction of the threaded element 106 and the mating threaded element 116 translates rotation of the traveler 114 in the first rotational direction S1 into linear movement of the traveler 114 parallel to the longitudinal axis 104. In an embodiment, the linear speed of the traveler 114 depends on one or more of a number of factors, such as one or more of the oscillation frequency of the motor and/or the oscillating component 102, the angular stroke of the oscillation of the motor and/or the oscillating component 102, the pitch angle of the threaded element 106 and/or the mating threaded element 116, the efficiency of the directional clutch 122 to grip the inner surface 112 of the oscillating component 102 when the oscillating component 102 rotates in the first rotational direction S1, or the efficiency of the directional clutch 122 to allow the traveler 114 to slip by the oscillating component 102 when the oscillating component 102 rotates in the second rotational direction S2.

As depicted in FIG. 1B, in an embodiment, the oscillating linear actuator 100 forms part of an oscillating linear displacement pump 130 assembly. In an embodiment, the oscillating linear displacement pump 130 includes a variable volume reservoir 124 that is formed in part by portions of the oscillating component 102 and the traveler 114. In an embodiment, the variable volume reservoir 124 is partly defined by an inner surface of a cap 126 at an end of the oscillating component 102. In an embodiment, the cap 126 includes one or more outlets 128. In an embodiment, the cap 126 is coupled to the oscillating component 102 such that the cap 126 oscillates with the oscillating component 102. Alternatively, the cap 126 remains fixed with respect to rotational movements of the oscillating component 102.

In an embodiment, as the traveler 114 moves linearly toward the cap 126, the size of the variable volume reservoir 124 decreases. A substance (not shown) can be located in the variable volume reservoir 124. As the size of the variable volume reservoir 124 decreases, a portion of the substance flows out of the variable volume reservoir 124 via the one or more outlets 128. In some embodiments, the substance is a liquid, a non-Newtonian substance, a gel, or any other type of substance that is capable of flowing through the one or more outlets 128. The oscillating linear displacement pump 130 allows an oscillating input (such as oscillating movements of a motor) to be converted into a linear displacement of the traveler 114 to dispense the substance out of the oscillating linear displacement pump 130.

Figure 2:
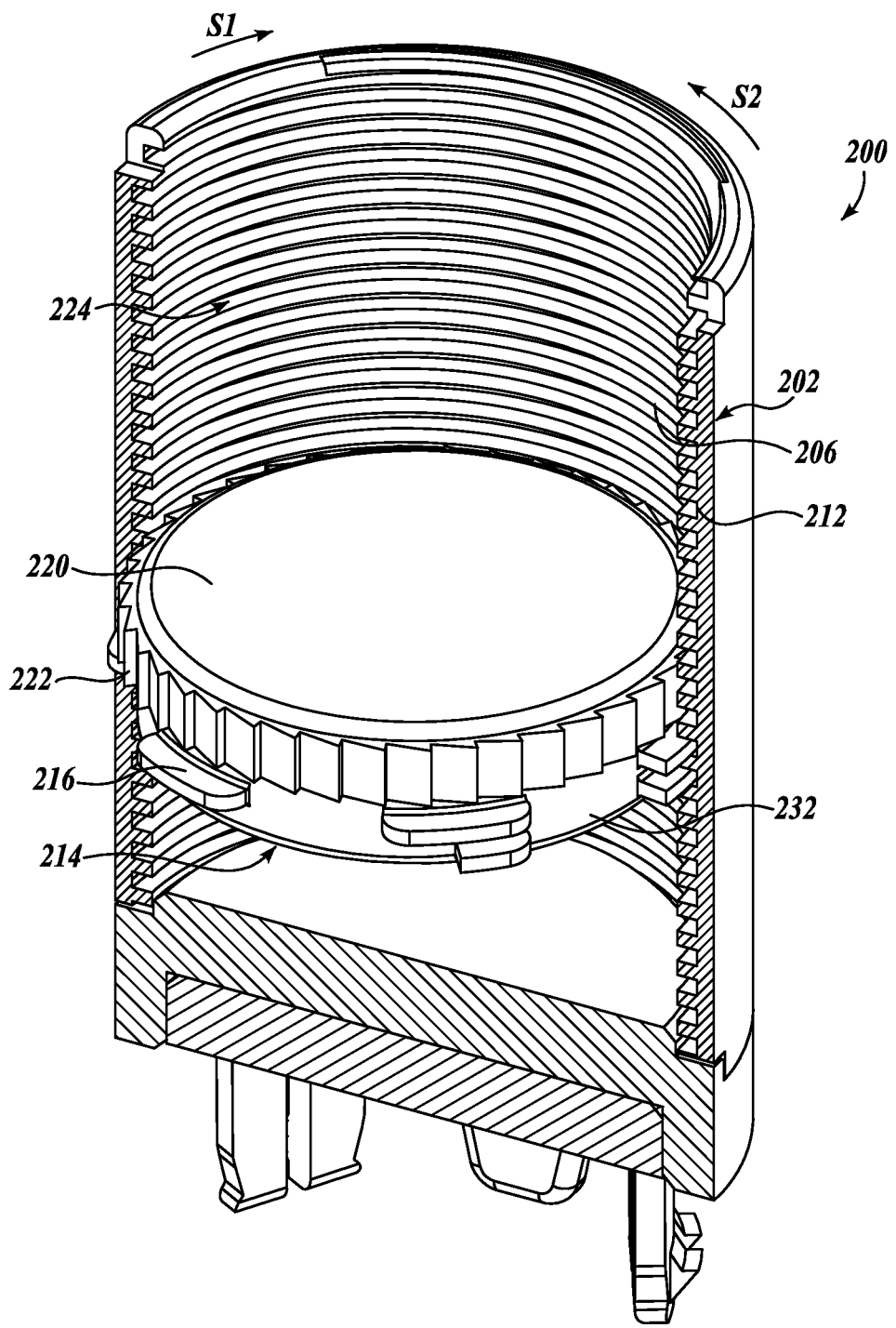
FIG. 2 depicts another embodiment of an oscillating linear actuator.

Another embodiment of an oscillating linear actuator is depicted in FIG. 2 in the form of an oscillating linear actuator 200. The oscillating linear actuator 200 includes an oscillating component 202 that is configured to be oscillated between a first rotational direction S1 and a second rotational direction S2. The oscillating component 202 is capable of being driven by a motor (not shown) that causes the oscillatory movements of the oscillating component 202. The oscillating component 202 includes a threaded element 206. In the embodiment depicted in FIG. 2, the threaded element 206 is in the form of internal threads on an inner surface 212 of the oscillating component 202.

In an embodiment, the oscillating linear actuator 200 also includes a traveler 214 located within the oscillating component 202. The traveler 214 includes a mating threaded element 216 that is configured to engage the threaded element 206. In the embodiment depicted in FIG. 2, the traveler 214 is in the form of a disc 220 and the mating threaded element 216 is in the form of external threads on a surface 232 around a circumference of the disc 220.

In an embodiment, the oscillating linear actuator 200 includes a directional clutch 222. The directional clutch 222 is configured to cause the oscillating component 202 to drive the traveler 214 in the first rotational direction S1 when the oscillating component 202 is rotated in the first rotational direction S1 and to allow the oscillating component 202 to slip by the traveler 214 when the oscillating component 202 is rotated in the second rotational direction S2. To accomplish this, the directional clutch 222 has a first coefficient of friction when the oscillating component 202 rotates in the first rotational direction S1 that is greater than a second coefficient of friction when the oscillating component rotates in the second rotational direction S2. The first coefficient of friction allows rotation of the oscillating component 202 in the first rotational direction S1 to cause rotation of the traveler 214 in the first rotational direction S1 and the second coefficient of friction allows the oscillating component 202 to slip by the traveler 214 when the oscillating component 202 is rotated in the second rotational direction S2. In the particular embodiment shown in FIG. 2, the directional clutch 222 is coupled to a surface 222 of the traveler 214 along a circumference of the disc 220.

In an embodiment, the interaction of the threaded element 206 and the mating threaded element 216 translates rotation of the traveler 214 in the first rotational direction Si into linear movement of the traveler 214 parallel to an axis of the disc 220. The linear speed of the traveler 214 depends on one or more of a number of factors, such as one or more of the oscillation frequency of the motor and the oscillating component 202, the angular stroke of the oscillation of the motor and the oscillating component 202, the pitch angle of the threaded element 206 and/or the mating threaded element 216, the efficiency of the directional clutch 222 to grip the inner surface 212 of the oscillating component 202 when the oscillating component 202 rotates in the first rotational direction S1, or the efficiency of the directional clutch 222 to allow the traveler 214 to slip by the oscillating component 202 when the oscillating component 202 rotates in the second rotational direction S2.

In an embodiment, the oscillating linear actuator 200 is a part of an oscillating linear displacement pump. In an embodiment, the oscillating linear displacement pump includes a variable volume reservoir 224 that is formed in part by portions of the oscillating component 202 and the traveler 214. In an embodiment, the variable volume reservoir 224 is further formed in part by a cap (e.g., the cap 126 depicted in FIG. 1B) at an end of the oscillating component 202. In an embodiment, the cap includes one or more outlets. In an embodiment, as the traveler 214 moves linearly, the size of the variable volume reservoir 224 decreases. As the size of the variable volume reservoir 224 decreases, a portion of the substance flows out of the variable volume reservoir 224 via the one or more outlets in the cap.

Figure 3:
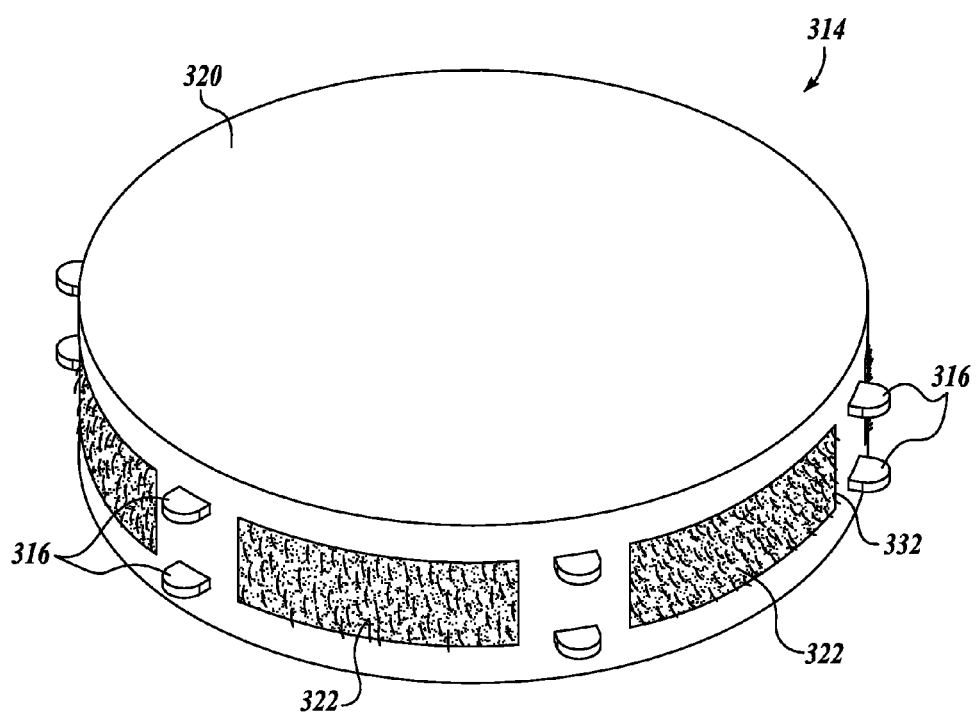
FIG. 3 depicts an embodiment of a traveler that can be used in place of the traveler shown in FIG. 2.

FIG. 3 depicts an embodiment of a traveler 314 that can be used in place of the traveler 214 shown in FIG. 2. The traveler 314 includes a disc 320 with a surface 322 around its circumference. The traveler 314 includes a mating threaded element 316. In the embodiment shown in FIG. 3, the mating threaded element 316 includes a number of tabs. More specifically, the embodiment depicts the tabs in pairs that are spaced around the circumference of the disc 320. In other embodiments, other arrangements of tabs are used to make up mating threaded element 316. The tabs of the mating threaded element 316 are configured to engage the threaded element 206 of the oscillating component 202 of the oscillating linear actuator 200. The traveler 314 also includes a directional clutch 322 that engages the inner surface 212 of the oscillating component 202 of the oscillating linear actuator 200. The directional clutch 322 can take the form of any of the directional clutches described herein. In the embodiment shown in FIG. 3, the directional clutch 322 includes several distinct portions that are spaced between the pairs of tabs of the mating threaded element 316. The distinct portions of the directional clutch 322 may be easier to manufacture than other directional clutches. The distinct portions of the directional clutch 322 may also provide space between the distinct portions for the mating threaded element 316 of the traveler 314. Other embodiments of travelers, beyond the traveler 214 depicted in FIG. 2 and the traveler 314 depicted in FIG. 3, are used in oscillating linear actuators.

Figure 4:
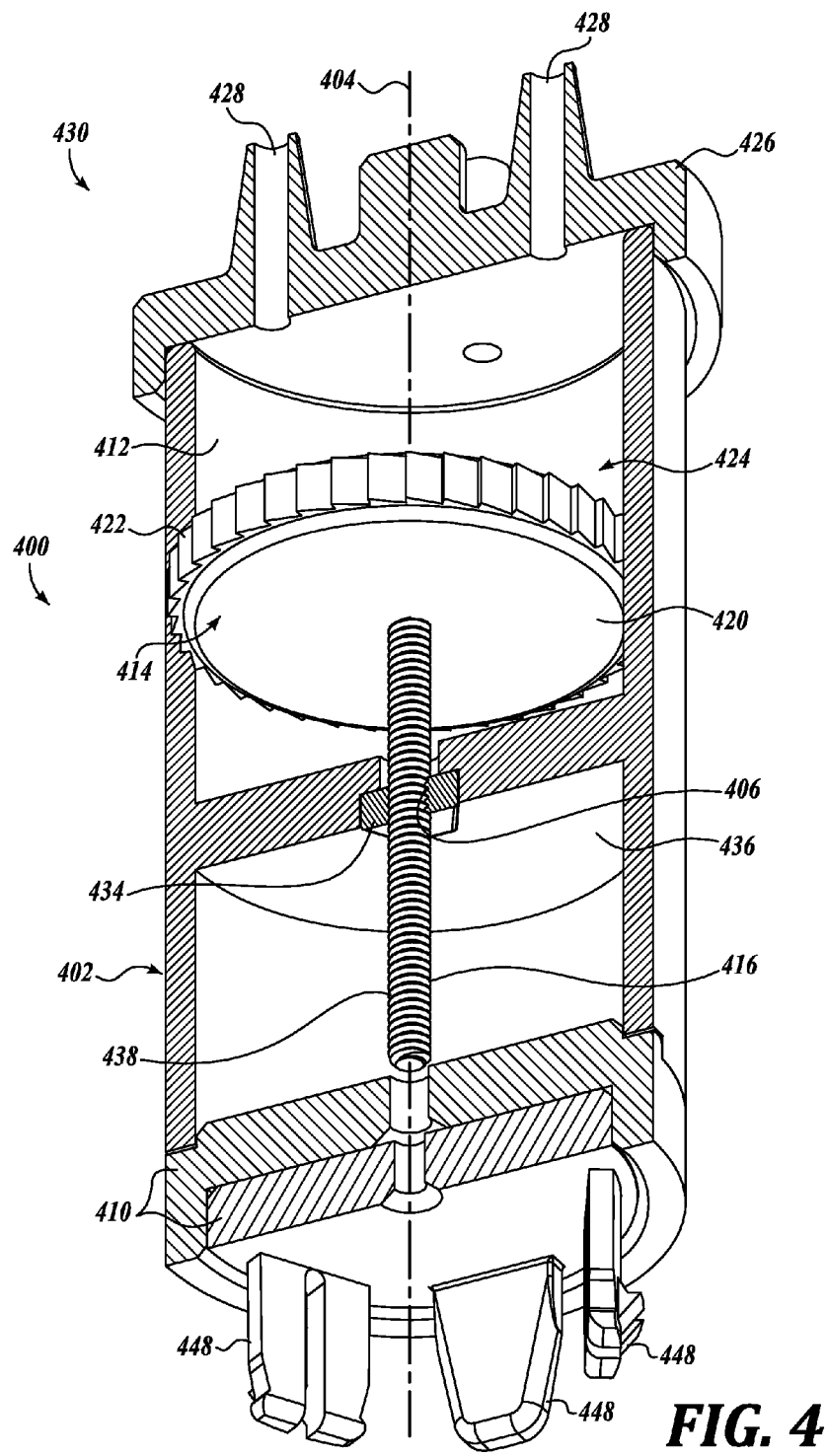
FIG. 4 depicts an embodiment of an oscillating linear actuator that is part of an oscillating linear displacement pump.

Another embodiment of an oscillating linear actuator is depicted in FIG. 4 in the form of an oscillating linear actuator 400. The oscillating linear actuator 400 is part of an oscillating linear displacement pump 430. The oscillating linear actuator 400 includes an oscillating component 402 that is configured to be oscillated about a longitudinal axis 404 of the oscillating linear actuator 400. The oscillating component 402 is capable of being driven by a motor (not shown) that causes the oscillatory movements of the oscillating component 402. In an embodiment, the oscillating component 402 is coupled to the motor via one or more tabs 448 on a base 410 of the oscillating component 402. The oscillating component 402 includes a threaded element 406. In the embodiment depicted in FIG. 4, the threaded element 406 is in the form of internal threads on a nut 434 embedded in a partition 436 of the oscillating component 402. The nut 434 is located substantially coaxially with the longitudinal axis 404. The oscillating component 402 also includes an inner surface 412.

The oscillating linear actuator 400 also includes a traveler 414 located within the oscillating component 402. The traveler 414 includes a mating threaded element 416 that is configured to engage the threaded element 406. In the embodiment depicted in FIG. 4, the mating threaded element 416 is in the form of external threads on a central screw 438 of the traveler 414. The central screw 438 is coupled to a disc 420 of the traveler 414 and arranged substantially coaxially with the longitudinal axis 404.

The oscillating linear actuator 400 also includes a directional clutch 422. The directional clutch 422 is configured to cause the oscillating component 402 to drive the traveler 414 in a first rotational direction when the oscillating component 402 is rotated in the first rotational direction and to allow the oscillating component 402 to slip by the traveler 414 when the oscillating component 402 is rotated in a second rotational direction. In the particular embodiment shown in FIG. 4, the directional clutch 422 is coupled to a surface of the traveler 414 along a circumference of the disc 420.

The interaction of the threaded element 406 and the mating threaded element 416 translates rotation of the traveler 414 in the first rotational direction into linear movement of the traveler 414 parallel to the longitudinal axis 404. The oscillating linear displacement pump 430 includes a variable volume reservoir 424 that is formed in part by portions of the oscillating component 402 and the traveler 414. In an embodiment, the variable volume reservoir 424 is further formed in part by a cap 426 at an end of the oscillating component 402. The cap 426 includes one or more outlets 428. As the traveler 414 moves linearly toward the cap 426, the size of the variable volume reservoir 424 decreases. In an embodiment, a substance (not shown) is located in the variable volume reservoir 424. As the size of the variable volume reservoir 424 decreases, a portion of the substance flows out of the variable volume reservoir 424 via the one or more outlets 428. The oscillating linear displacement pump 430 allows an oscillating input (e.g., oscillating movements of a motor) to be converted into a linear displacement of the traveler 414 to dispense the substance out of the oscillating linear displacement pump 430.

Figure 5:
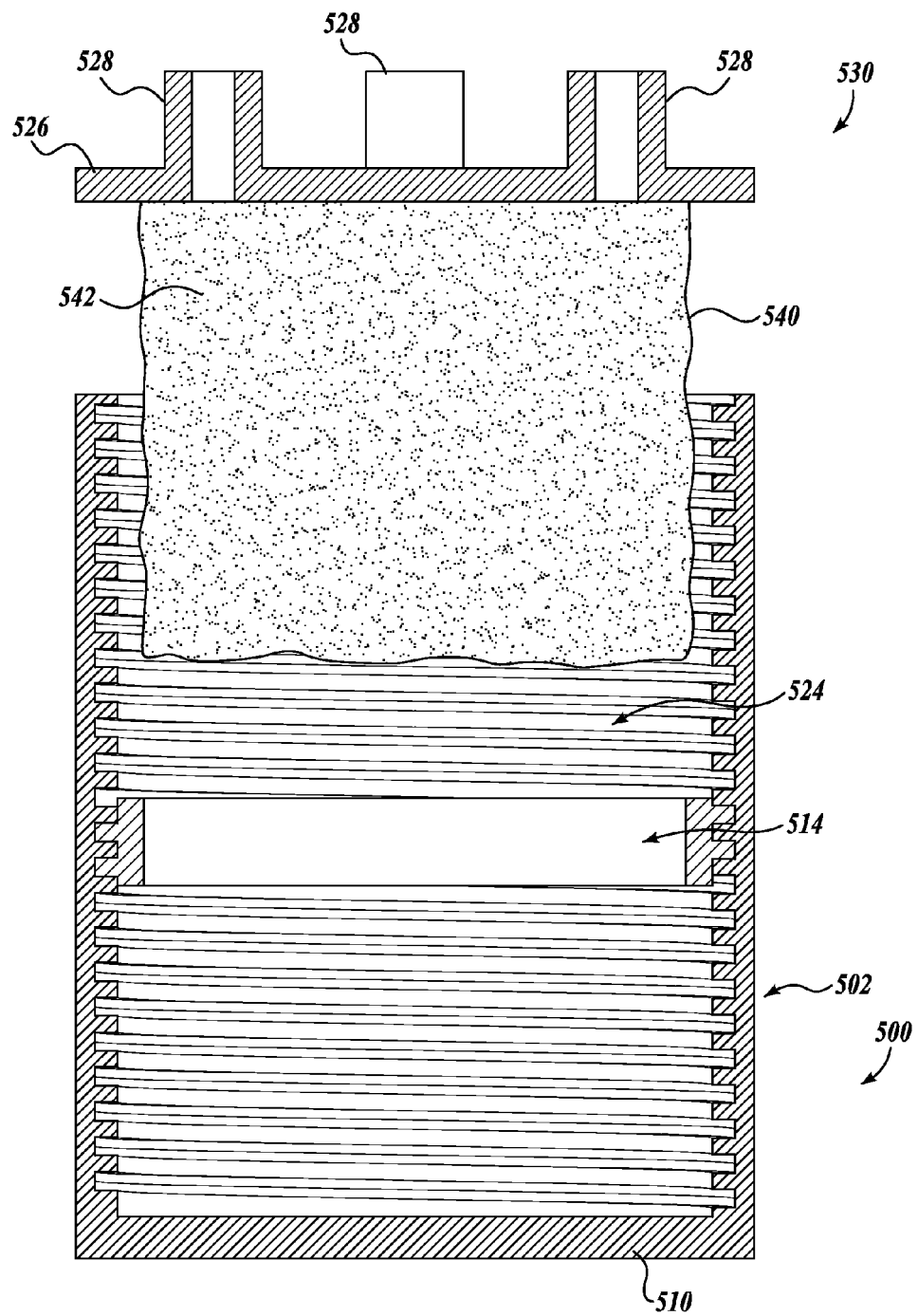
FIG. 5 depicts another embodiment of an oscillating linear actuator that is part of an oscillating linear displacement pump.

Another embodiment of an oscillating linear actuator is depicted in FIG. 5 in the form of an oscillating linear actuator 500 that is part of an oscillating linear displacement pump 530. The oscillating linear actuator 500 includes an oscillating component 502 and a traveler 514. The oscillating linear actuator 500 is configured such that the traveler 514 moves linearly away from a base 510 of the oscillating component 502 in response to oscillatory movements of the oscillating component 502.

The oscillating linear displacement pump 530 includes a cap 526. In the depiction shown in FIG. 5, the cap 526 is removed away from the oscillating component 502; however, in instances of operation, the cap 526 is in contact with the oscillating component 502. The cap 526 includes one or more outlets 528. A variable volume reservoir 524 is formed in part by portions of the oscillating component 502, the traveler 514, and the cap 526. The oscillating linear displacement pump 530 also includes a bladder 540 that holds a substance 542. In an embodiment, the bladder 540 is made of a compliant material, such as a plastic, a rubber, or any other compliant material. In an embodiment, the bladder 540 is in fluid communication with the one or more outlets 528.

During operation of the oscillating linear displacement pump 530, the bladder 540 is located in the variable volume reservoir 524. As the oscillating component 502 oscillates, the traveler 514 moves linearly away from the base 510 toward the cap 526. The linear movements of the traveler 514 toward the cap 526 reduce the size of the variable volume reservoir 524. As the size of the variable volume reservoir 524 is reduced, the bladder 540 contracts to cause a portion of the substance 542 to flow through the one or more outlets 528. Thus, portions of the substance 542 are pumped out of the oscillating linear displacement pump 530 by oscillating the oscillating component 502. A bladder, such as bladder 540, can be used in variable volume reservoirs of any of the embodiments of oscillating linear displacement pumps described herein.

In another embodiment, not depicted in FIG. 5, the oscillating linear displacement pump 530 could operate without the bladder 540. In this embodiment, the substance 542 is located directly in the variable volume reservoir 524 and the substance 542 is forced out of the variable volume reservoir 524 as the linear movements of the traveler 514 toward the cap 526 reduce the size of the variable volume reservoir 524.

Figure 6A:
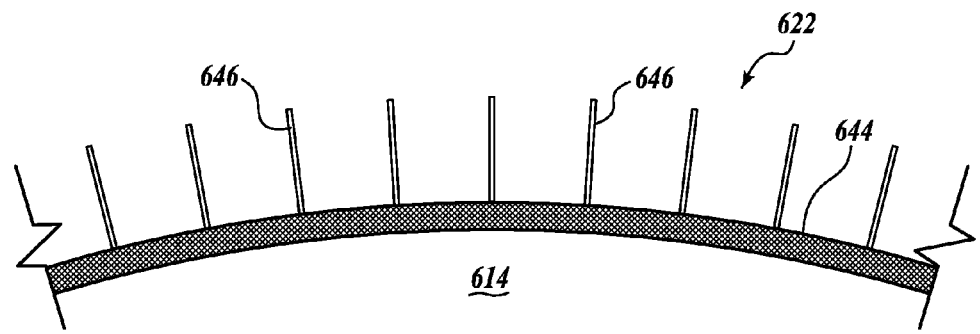
FIGS. 6A and 6B depict an embodiment of a directional clutch, in accordance with aspects of the present disclosure.
Figure 6B:
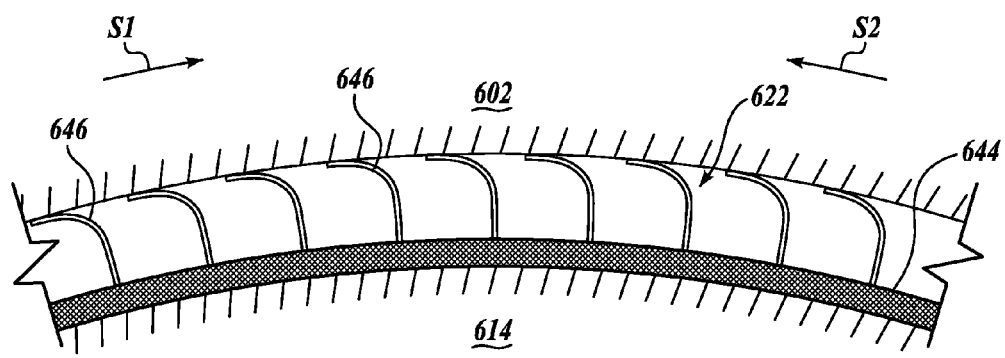

An embodiment of a directional clutch 622 that can be used in any of the oscillating linear actuators describe herein is depicted in FIGS. 6A and 6B. The directional clutch 622 includes a base 644 adhered to the traveler 614. A number of projecting members 646 extend from the base 644. FIGS. 6A and 6B depict, respectively, the directional clutch 622 on the traveler 614 without and with an oscillating component 602. As shown in FIG. 6B, when the oscillating component 602 is located near the traveler 614, the projecting members 646 come into contact with the oscillating component 602 and are biased in a particular direction. In this way, the directional clutch 622 is configured to cause the oscillating component 602 to drive the traveler 614 in a first rotational direction S1 when the oscillating component 602 is rotated in the first rotational direction S1 and to allow the oscillating component 602 to slip by the traveler 614 when the oscillating component 602 is rotated in a second rotational direction S2.

In one embodiment, the directional clutch 622 has a first coefficient of friction when the oscillating component 602 rotates in the first rotational direction S1 and a second coefficient of friction when the oscillating component 602 rotates in the second rotational direction S2. The first coefficient of friction is greater than the second coefficient of friction such that rotation of the oscillating component 602 in the first rotational direction S1 causes rotation of the traveler 614 in the first rotational direction S1 and rotation of the oscillating component 602 in the second rotational direction S2 causes the oscillating component 602 to slip by the traveler 614.

Each of the first and second coefficients of friction described herein can be one or more of a dynamic coefficient of friction or a static coefficient of friction. Dynamic and static coefficients of friction can be measured according to ISO standard 8295. In one embodiment, a ratio of the first coefficient of friction to the second coefficient of friction is greater than or equal to about 5:1. In another embodiment, a ratio of the first coefficient of friction to the second coefficient of friction is greater than or equal to about 10:1.

The projecting members 646 can take a number of forms. In one embodiment, the projecting members 646 are fibers, such as bristles or fiber loops. In other embodiments, the projecting members 646 are artificial, such as synthetic fibers, or natural, such as animal hair. In another embodiment, the projecting members 646 are macroscopic members, such as scales. In another embodiment, the projecting members 646 are affixed to the base 644, such as in the case of velvet or baize. In one embodiment, the base 644 is adhered to the surface of the traveler 614. Alternatively, in another embodiment, the base 644 and the projecting members 646 are replaced by applying a surface treatment to a surface of the traveler 614, such as flocking.

The embodiment of the directional clutch 622 depicted in FIGS. 6A and 6B may be mechanically simple and relatively lightweight compared to other forms of directional clutches, such as gear and pawl ratchets. Even though the directional clutch 622 may be mechanically simple and relatively lightweight, the directional clutch 622 is still effective to perform the driving and slipping functions described above. However, in an embodiment, a directional clutch between an oscillating components and a traveler is a more mechanically-complex system, such as a gear and pawl ratchet system.

Figure 7A:
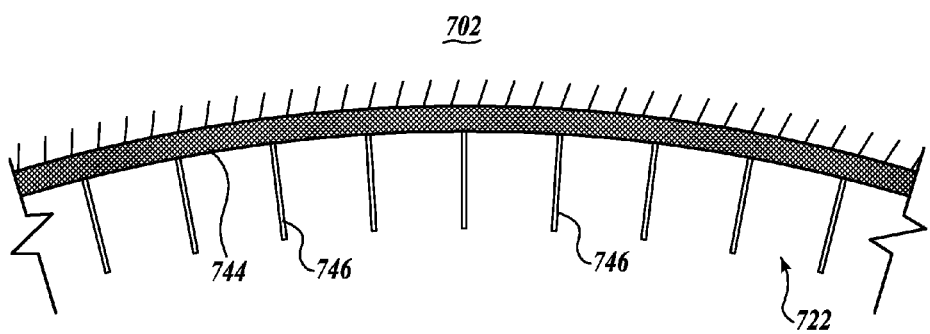
FIGS. 7A and 7B depict another embodiment of a directional clutch, in accordance with aspects of the present disclosure.
Figure 7B:
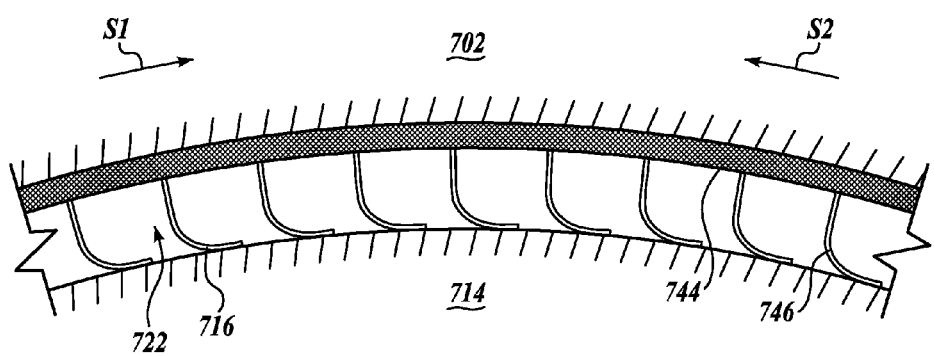

Another embodiment of a directional clutch 722 that can be used in any of the oscillating linear actuators described herein is depicted in FIGS. 7A and 7B. The directional clutch 722 includes a base 744 adhered to an oscillating component 702. A number of projecting members 746 extend from the base 744. FIGS. 7A and 7B depict, respectively, the directional clutch 722 on the oscillating component 702 without and with a traveler 714. As shown in FIG. 7B, when the traveler 714 is located near the oscillating component 702, the projecting members 746 come into contact with the oscillating component 702 and are biased in a particular direction. In this way, the directional clutch 722 is configured to cause the oscillating component 702 to drive the traveler 714 in a first rotational direction S1 when the oscillating component 702 is rotated in the first rotational direction S1 and to allow the oscillating component 702 to slip by the traveler 714 when the oscillating component 702 is rotated in a second rotational direction S2. The directional clutch 722 differs from the directional clutch 622 in that the directional clutch 722 is adhered to the oscillating component 702 while the directional clutch 622 is adhered to the traveler 614; however, the embodiments and variations described above with respect to directional clutch 622 also apply to directional clutch 722.

Any of the directional clutches described in the present disclosure can be used in place of any of the other directional clutches describe in the various embodiments of the oscillating linear actuators and oscillating linear displacement pumps described herein. In one example, the embodiments of directional clutches 622 and 722 depicted in FIGS. 6A, 6B, 7A, and 7B can be used in place of any of the saw-tooth directional clutches, such as directional clutch 122 in FIGS. 1A and 1B. In another example, a ratchet and pawl directional clutch can be used in place of any of the saw-tooth directional clutches, such as directional clutch 222 in FIG. 2. In yet another example, a saw-tooth directional clutch can be used in place of the directional clutch 322 in FIG. 3.

Figure 8A:
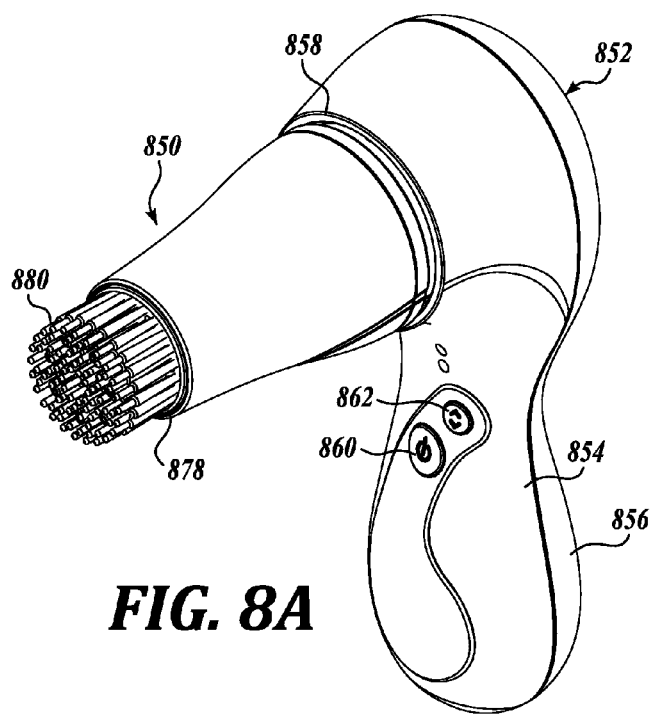
FIG. 8A depicts a perspective view of one example of an applicator head and an appliance, in accordance with aspects of the present disclosure.
Figure 8B:
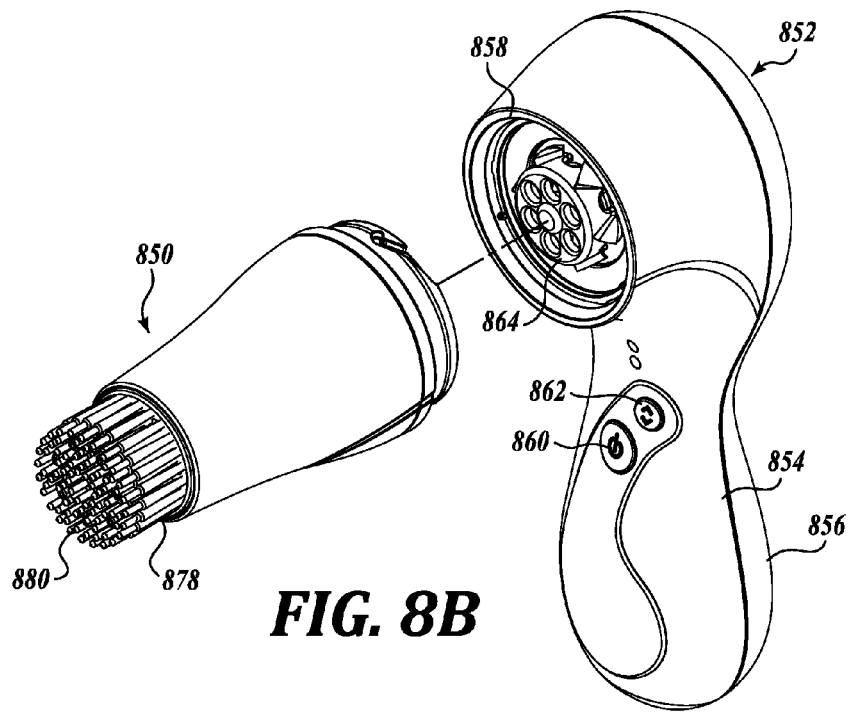
FIG. 8B depicts an exploded view of the applicator head and the appliance of FIG. 8A.

Any of the oscillating linear actuators and/or oscillating linear displacement pumps disclosed herein can be used in any type of practical application. In one example, FIG. 8A depicts an embodiment of an applicator head 850 that includes an oscillating linear actuator and/or an oscillating linear displacement pump in accordance with any of the embodiments described herein. FIG. 8B depicts an exploded view of the applicator head 850 and the appliance 852. The applicator head 850 is suitable for use with a personal care appliance, such as appliance 852. The personal care appliance 852 may be employed to impart an oscillating motion to the applicator head 850, as described in greater detail below. While the personal care appliance 852 is one type of appliance that in accordance with embodiments of the present disclosure, it will be appreciated that the applicator head 850 is suitable for use with a wide range of oscillatory motion generating devices.

The appliance 852 includes a body 854 having a handle portion 856 and a head attachment portion 858. The head attachment portion 858 is configured to selectively attach a head, such as applicator head 850, to the appliance 852. The head attachment portion 858 includes a mating interface 864 (illustrated in FIG. 8B). The appliance body 854 houses the operating structure of the appliance 852.

Figure 8C:
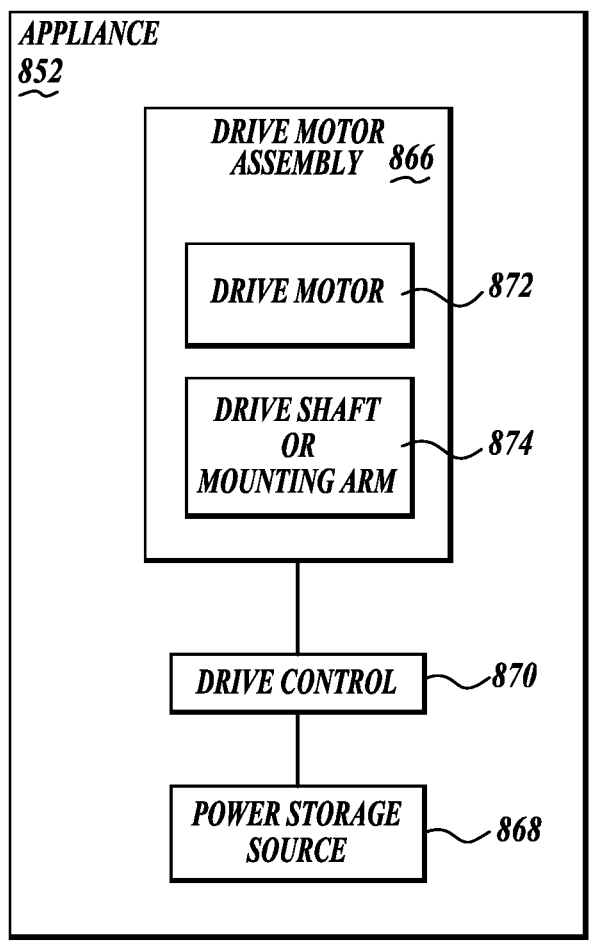
FIG. 8C is a diagram of exemplary components of the appliance of FIG. 8A.

As shown in block diagrammatic form in FIG. 8C, the operating structure in one embodiment includes a drive motor assembly 866, a power storage source 868, such as a rechargeable battery, and a drive control 870 that includes an on/off button 860 (e.g., in FIGS. 8A and 8B) configured and arranged to selectively deliver power from the power storage source 868 to the drive motor assembly 870. In an embodiment, the drive control 870 may also include a power adjust or mode control buttons 862 coupled to control circuitry, such as a programmed microcontroller or processor, which is configured to control the delivery of power to the drive motor assembly 866. The drive motor assembly 866 in an embodiment includes an electric drive motor 872 that drives an attached head, such as applicator head 850, via a drive gear assembly.

When the applicator head 850 is mounted to the head attachment portion 858, as depicted in FIG. 8A, the drive motor assembly 866 is configured to impart oscillatory motion to the applicator head 850 in a first rotational direction S1 and a second rotational direction S2. The appliance 852 may be configured to oscillate the applicator head 850 at sonic frequencies, typically in the range of about 20 Hz to about 1 kHz. In an embodiment, the appliance 852 oscillates at frequencies from about 80 Hz to about 200 Hz and a duty cycle of about 38-44%. One example of a drive motor assembly 866 that may be employed by the appliance 852 to oscillate the applicator head 850 is shown and described in U.S. Pat. No. 7,786,646. However, it should be understood that this is merely an example of the structure and operation of one such appliance and that the structure, operation frequency and oscillation amplitude of such an appliance could be varied, depending in part on its intended application and/or characteristics of the applicator head, such as its inertial properties, etc. In an embodiment of the present disclosure, the frequency ranges are selected so as to drive the attached head at near resonance. Thus, selected frequency ranges are dependent, in part, on the inertial properties of the attached head. It will be appreciated that driving the attached head at near resonance provides many benefits, including the ability to drive the attached head at suitable amplitudes in loaded conditions (e.g., when contacting the skin). For a more detailed discussion on the design parameters of the appliance, please see U.S. Pat. No. 7,786,646.

FIG. 8D depicts a cross-sectional view of the applicator head 850 and a partial cross-sectional view of the appliance 852 from FIGS. 8A to 8C. The applicator head 850 includes an embodiment of an oscillating linear displacement pump 830. The applicator head 850 includes an interface end 882 that is configured to interface with the mating interface 864 on appliance 852. In one embodiment, the interface end 882 is formed as a part of a base 810 of an oscillating component 802 of the oscillating linear displacement pump 830 in the applicator head 852. When the applicator head 850 is attached to the appliance 852, oscillations of the appliance 852 (e.g., oscillations of the drive motor 872) is transferred to the applicator head 850 to cause a portion of the applicator head 850 to oscillate. For example, the drive motor 872 oscillates the mating interface 864, which oscillates the base 810 of the oscillating component 802.

The oscillating linear displacement pump 830 includes the oscillating component 802 and a traveler 814. The oscillating component 802 includes a threaded element 806 in the form of a central screw and the traveler 814 included a mating threaded element 816 near a center of the traveler 814. The oscillating linear displacement pump 830 also includes a directional clutch 822 located between at least a portion of the oscillating component 802 and at least a portion of the traveler 814. The directional clutch 822 is configured to cause the oscillating component 802 to drive the traveler 814 in a first rotational direction when the oscillating component 802 is rotated in the first rotational direction and to allow the oscillating component 802 to slip by the traveler 814 when the oscillating component 802 is rotated in a second rotational direction.

The oscillating linear displacement pump 830 includes a variable volume reservoir 824 with one or more outlets 828. In the particular embodiment shown in FIG. 8D, the one or more outlets 828 are located on a cap 826. A substance 842 is stored in the variable volume reservoir 824. The threaded element 806 of the oscillating component 802 and the mating threaded element 816 of the traveler 814 are engaged such that rotational movement of the traveler 814 in the first rotational direction causes linear movement of the traveler 814 to cause at least a portion of the substance 842 to flow out of the variable volume reservoir 826 through the one or more outlets 828. The one or more outlets 828 are configured to allow the substance 842 to flow from the variable volume reservoir 824 to an end 878 of the applicator head 850.

The applicator head 850 includes bristles 880 extending from the end 878 at which the substance 842 flows out of the variable volume reservoir 826. In one embodiment, the bristles 880 are long and soft such that the bristles 880 oscillate when the appliance 852 oscillates. The bristles 880 may be made of polybutylene terephthalate (PBT), polyethylene terephthalate (PET), nylon, polyester, a thermoplastic elastomer (TPE), or combinations thereof, etc. When the bristles 880 are in contact with cosmetic formulation on a user's skin, in one example, the vibration of the bristles 880 produces a particular finish of the cosmetic formulation on the user's skin.

In an embodiment, the bristles 880 are generally circular in cross-section, although the cross-sections of the bristles 880 may vary, including square cross sections, X-shaped cross sections, etc. Additionally, the bristles 880 in an embodiment are formed with or without rounded ends. Further, the bristles 880 may be treated with anti-microbial agents in an embodiment or coated with an anti-microbial material, such as silver zeolites, zinc, copper, gold, etc. In other embodiments, the use of silver zeolite may be compounded into the resin that is used to construct the bristles 880 to reduce the bacterial and fungal effects on the bristles.

In an embodiment, the substance 842 is a cosmetic formulation, such as makeup, personal soap, skin care product, hair care product, or any other cosmetics product. In some examples, makeup includes foundation, blush, highlighter, bronzer, or any other type of makeup. In some examples, personal soap includes facial cleanser, body wash, or any other type of personal soap. In some examples, skin care products include lotions, skin exfoliants, masking formulations, or any other type of skin care product. In some examples, hair care products include shampoos, conditioners, shaving cream, or any other type of hair care products. In other embodiments, the substance 842 is any other type of substance that is capable of being dispensed out of the one or more outlets 828.

The rate at which the substance 842 is dispensed from the oscillating linear displacement pump 830 depends on at least one or more of the following factors: the speed of the electric drive motor 872, the gear ratio between the electric drive motor 872 and the mating interface 864, the oscillation frequency of the mating interface 864 and the oscillating component 802, the angular stroke of the oscillation of the mating interface 864 and the oscillating component 802, the pitch angle of the threaded element 806 and/or the mating threaded element 816, the efficiency of the directional clutch 822 to grip the inner surface 812 of the oscillating component 802 when the oscillating component 802 rotates in the first rotational direction, or the efficiency of the directional clutch 822 to allow the traveler 814 to slip by the oscillating component 802 when the oscillating component 802 rotates in the second rotational direction. In one embodiment, the speed of the electric drive motor 872 is controlled to control the amount of rate at which the substance 842 is dispensed from oscillating linear displacement pump 830. For example, in one embodiment, the speed of the electric drive motor 872 is adjusted based on user inputs into the appliance 852, such as presses of power adjust or mode control buttons 862.

The above-described examples of the applicator head 850 can be used to apply a substance 842, such as a cosmetic formulation, to a user's skin and to apply a finish to the cosmetic formulation on the user's skin. In that regard, the applicator head 850 is first attached to the personal care appliance 852. The substance 842 is dispensed from the oscillating linear displacement pump 830 via the one or more outlets 828 to the bristles 880. Next, the dispensed substance 842 is applied by brushing the bristles 880 against the user's skin. Next, if desired, a finish is applied to the substance 842 applied to the user's skin by vibrations of the tips of the bristles 880 as the bristles 880 are brushed against the user's skin. The vibrations of the tips of the bristles 880 are caused by oscillation of a motor in appliance 852. If desired, the applicator head 850 is detached from the appliance 852 and a different applicator head is attached to the appliance 852.

Figure 8E:
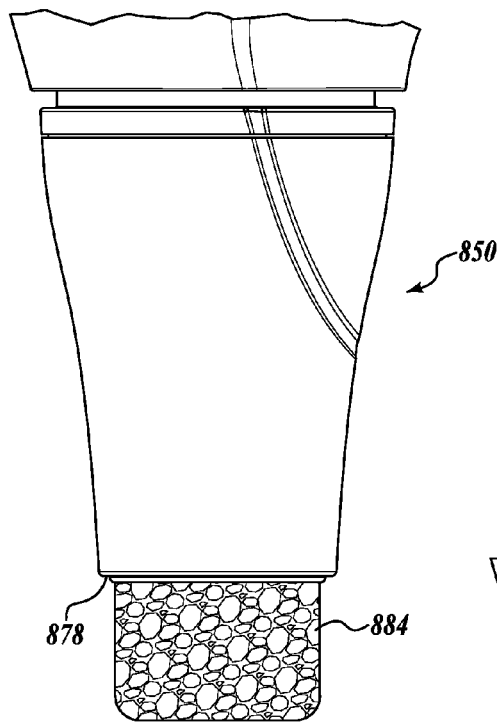
FIGS. 8E and 8F depict alternate embodiments of the applicator head depicted in FIG. 8D.
Figure 8F:
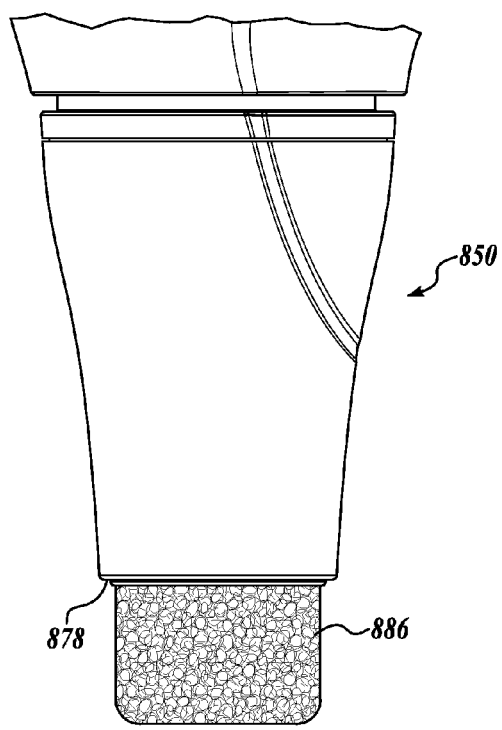

Alternative embodiments to the bristles 880 on the applicator head 850 are depicted in FIGS. 8E and 8F. In FIG. 8E, the applicator head 850 includes a sponge 884 affixed to the end 878. In an embodiment, the sponge 884 is a non-closed cell foam that allows the substance 842 to be absorbed by the sponge 884 and released when the sponge 884 is compressed. In an embodiment, the substance 842 is dispensed from the oscillating linear displacement pump 830 through the sponge 884. The sponge 884 is used to apply and finish a substance 842 dispensed from the oscillating linear displacement pump 830 of the applicator head 850. Oscillation of a motor in appliance 852 causes the sponge 884 to vibrate when applying the substance 842 to a user's skin. In FIG. 8F, the applicator head 850 includes a pad 886 affixed to the end 878. In one embodiment, the pad 886 is a porous or non-porous material that does not absorb the substance 842, but is capable of distributing and/or wiping the substance 842. The pad 886 is used to apply and finish a substance 842 dispensed from the oscillating linear displacement pump 830 of the applicator head 850. Oscillation of a motor in appliance 852 causes the pad 886 to vibrate when applying the substance 842 to a user's skin. In other embodiments, other forms of applicator tips can be used on the end 878 of the applicator head 850 in place of the bristles 880 in FIG. 8C, in place of the sponge 884 in FIG. 8D, and in place of the pad 886 in FIG. 8F.

The methods described above can be carried out to apply a cosmetic formulation to a user's skin and to finish the cosmetic formulation on the user's skin. However, any type of formulation, such as other personal care formulations, can be used as part of the method disclosed above.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A pump assembly, comprising:
   an oscillating component including a threaded element;
   a motor coupled to the oscillating component and configured to cause the oscillating component to move in an oscillatory manner between a first rotational direction and a second rotational direction about a longitudinal axis of the pump;
   a traveler operably coupled to the oscillating component and having a mating threaded element; and
   a directional clutch located between at least a portion of the oscillating component and at least a portion of the traveler, the directional clutch having a first coefficient of friction when the oscillating component rotates in the first rotational direction and a second coefficient of friction when the oscillating component rotates in the second rotational direction,
   wherein the threaded element of the oscillating component and the mating threaded element of the traveler are engaged such that rotational movement of the traveler in the first rotational direction causes displacement of the traveler along an axis substantially parallel to the longitudinal axis.

2. The pump assembly of claim 1, wherein the first coefficient of friction is greater than the second coefficient of friction such that rotation of the oscillating component in the first rotational direction causes rotation of the traveler in the first rotational direction and rotation of the oscillating component in the second rotational direction causes the oscillating component to slip by the traveler.

3. The pump assembly of claim 1, further comprising:
   a variable volume reservoir bounded in part by the oscillating component and the traveler, wherein the pump assembly is configured to vary a volume of the variable volume reservoir by a displacement of the traveler.

4. The pump of claim 3, further comprising:
   a composition received within the variable volume reservoir; and
   a cap having at least one composition outlet;
   wherein the variable volume reservoir is further bounded in part by the cap, and wherein the pump assembly is configured to dispense a substance received within the variable volume reservoir through the at least one outlet responsive to displacement of the traveler.

5. The pump of claim 4, further comprising:
   a bladder located within the variable volume reservoir,
   wherein the composition is located within the bladder, and wherein the bladder is in fluid communication with the at least one outlet.

6. The pump of claim 4, wherein the composition includes a cosmetic formulation.

7. The pump of claim 1, wherein a ratio of the first coefficient of friction to the second coefficient of friction is greater than or equal to about 5:1.

8. A linear actuator configured to be driven by a source of oscillating motion, the linear actuator comprising:
   a traveler;
   an oscillating component operably coupled to the traveler, the oscillating component configured to oscillate responsive to an applied force from a motor assembly; and
   a directional clutch located between at least a portion of the oscillating component and at least a portion of the traveler, wherein the directional clutch is configured to cause the oscillating component to drive the traveler in the first rotational direction when the oscillating component is rotated in the first rotational direction and to allow the oscillating component to slip by the traveler when the oscillating component is rotated in the second rotational direction,
   wherein the oscillating component is operably coupled to the traveler such that rotational movement of the traveler in the first rotational direction causes displacement of the traveler along a travel direction.

9. The linear actuator of claim 8, wherein the oscillating component is operably coupled to the traveler via engagement of a threaded element of the oscillating component and a mating threaded element of the traveler, and wherein the threaded element of the oscillating component includes a central screw located substantially coaxially with the longitudinal axis, the central screw having external threads.

10. The linear actuator of claim 9, wherein the mating threaded element of the traveler includes a bushing having internal threads configured to engage the external threads of the central screw.

11. The linear actuator of claim 10, wherein the bushing includes a nut embedded in a disc-shaped portion of the traveler.

12. The linear actuator of claim 8, wherein the traveler has a disc shape having a surface around a circumference of the disc shape.

13. The linear actuator of claim 12, wherein the directional clutch is located on at least a portion of the surface around the circumference of the disc shape.

14. The linear actuator of claim 13, wherein the directional clutch located on the at least a portion of the surface is configured to engage an inner surface of the oscillating component.

15. The linear actuator of claim 12, wherein the oscillating component is operably coupled to the traveler via engagement of a threaded element of the oscillating component and a mating threaded element of the traveler, and wherein the mating threaded element and the directional clutch are both located on at least a portion of the surface around the circumference of the disc shape.

16. The linear actuator of claim 15, wherein the mating threaded element located on the at least a portion of the surface is configured to engage internal threads on an inner surface of the oscillating component.

17. The linear actuator of claim 8, wherein the oscillating component is operably coupled to the traveler via engagement of a threaded element of the oscillating component and a mating threaded element of the traveler, and wherein the mating threaded element of the traveler includes a central screw having external threads.

18. The linear actuator of claim 17, wherein the threaded element of the oscillating component includes a bushing having internal threads configured to engage the external threads of the central screw.

19. A system comprising:
an appliance having a motor; and
an applicator head assembly coupled to the appliance, the applicator head assembly including:
an oscillating component having an inner surface defining a portion of a variable volume reservoir including at least one composition outlet;
a traveler operably coupled to the oscillating component; and
a directional clutch located between at least a portion of the oscillating component and at least a portion of the traveler, wherein the directional clutch is configured to cause the oscillating component to drive the traveler in the first rotational direction when the oscillating component is rotated in the first rotational direction and to allow the oscillating component to slip by the traveler when the oscillating component is rotated in the second rotational direction,
wherein the oscillating component and the traveler are engaged such that rotational movement of the traveler in the first rotational direction causes linear movement of the traveler to cause at least a portion of a composition received in the variable volume reservoir to flow out of the at least one composition outlet responsive to an applied oscillating force by the appliance.

20. The system of claim 19, wherein the appliance further comprises:
one or more input controls configured to receive user inputs for controlling the motor in order to control a flow rate of the at least a portion of the substance flowing through the at least one outlet.

21. The system of claim 19, wherein the applicator head assembly is detachable from the appliance, and wherein the appliance is configured to be coupled to a different applicator head assembly following detachment of the applicator head assembly from the appliance.

22. The system of claim 19, wherein the composition includes a cosmetic formulation.

23. The system of claim 22, wherein the at least one composition outlet is configured to allow the cosmetic formulation to flow from the variable volume reservoir to an end of the applicator head assembly.

24. The system of claim 23, wherein the end of the applicator head assembly includes at least one of bristles, a sponge, or a pad, and wherein the at least one of the bristles, the sponge, or the pad is configured to apply the cosmetic formulation to a user's skin.

25. The system of claim 19, wherein the oscillating component is configured to be coupled to the motor when the applicator head assembly is coupled to the appliance and to be driven by the motor to cause oscillatory movements of the oscillating component.

26. The system of claim 19, wherein a frequency range of the motor is selected based on a resonance of the applicator head assembly.

* * * * *